(12) United States Patent
Jonas et al.

(10) Patent No.: US 7,526,873 B2
(45) Date of Patent: May 5, 2009

(54) USE OF SURFACE MEASUREMENT PROBES

(75) Inventors: Kevyn Barry Jonas, Bristol (GB); Geoffrey McFarland, Dursley (GB)

(73) Assignee: Renishaw PLC, Gloucestershire (GB)

( * ) Notice: Subject to any disclaimer, the term of this patent is extended or adjusted under 35 U.S.C. 154(b) by 37 days.

(21) Appl. No.: 11/658,162

(22) PCT Filed: Aug. 5, 2005

(86) PCT No.: PCT/GB2005/003095

§ 371 (c)(1),
(2), (4) Date: Jan. 23, 2007

(87) PCT Pub. No.: WO2006/013387

PCT Pub. Date: Feb. 9, 2006

(65) Prior Publication Data

US 2008/0028626 A1      Feb. 7, 2008

(30) Foreign Application Priority Data

Aug. 6, 2004     (GB) ................................ 0417536.0

(51) Int. Cl.
  *G01B 5/008* (2006.01)
(52) U.S. Cl. .......................................... 33/561; 702/95
(58) Field of Classification Search ........... 33/502–504, 33/556, 558, 559, 561, 1 M; 702/94, 95; 73/1.79
See application file for complete search history.

(56) References Cited

U.S. PATENT DOCUMENTS

| | | | |
|---|---|---|---|
| 3,869,799 A | | 3/1975 | Neuer et al. |
| 4,118,871 A | * | 10/1978 | Kirkham ...................... 33/505 |
| 4,875,177 A | * | 10/1989 | Jarman ........................ 702/95 |
| 4,991,304 A | | 2/1991 | McMurtry |
| 5,333,386 A | * | 8/1994 | Breyer et al. ................. 33/1 M |

(Continued)

FOREIGN PATENT DOCUMENTS

DE      269 12 861 U1     10/1996

(Continued)

OTHER PUBLICATIONS

"UMESS 300 Universal-Meβprogramm" Bearbeitungsstand: Aug. 18, 1987.

(Continued)

*Primary Examiner*—G. Bradley Bennett
*Assistant Examiner*—Amy Cohen Johnson
(74) *Attorney, Agent, or Firm*—Oliff & Berridge, PLC

(57) ABSTRACT

A method of measuring an artifact using a machine on which a measuring probe is mounted. The method has the following steps: determining the approximate position of one or more points on the surface of the artifact; using this approximate position to drive at least one of the probe and artifact to one or more desired relative positions of the probe and the surface and taking one or more surface measurements of said point on the surface of the artifact at said location, wherein there is no relative movement between the probe and the artifact whilst the one or more surface measurements are taken; and using data from the measurements to determine a position of the one or more points on the surface in which dynamic error is substantially reduced.

27 Claims, 6 Drawing Sheets

U.S. PATENT DOCUMENTS

| | | | | |
|---|---|---|---|---|
| 5,390,424 | A | | 2/1995 | Butter et al. |
| 5,764,540 | A | | 6/1998 | Grupp et al. |
| 5,767,380 | A | * | 6/1998 | Haas .......................... 73/1.79 |
| 6,434,846 | B1 | * | 8/2002 | McMurtry et al. ............ 33/502 |
| 6,591,208 | B2 | * | 7/2003 | Lotze et al. .................... 702/95 |
| 6,601,311 | B2 | * | 8/2003 | McMurtry et al. ............ 33/502 |
| 6,810,597 | B2 | * | 11/2004 | Grzesiak et al. ............... 33/503 |
| 7,131,207 | B2 | * | 11/2006 | McFarland ................... 33/503 |
| 7,254,506 | B2 | * | 8/2007 | McMurtry et al. ............ 702/95 |
| 7,318,284 | B2 | * | 1/2008 | McMurtry et al. ............ 33/503 |
| 2002/0029119 | A1 | | 3/2002 | Lotze et al. |
| 2004/0055170 | A1 | | 3/2004 | Grzesiak et al. |
| 2008/0033680 | A1 | * | 2/2008 | Grupp ......................... 702/95 |

FOREIGN PATENT DOCUMENTS

| | | |
|---|---|---|
| DE | 10 2004 007 968 A1 | 9/2005 |
| EP | 0 599 513 A1 | 6/1994 |
| WO | WO 92/20996 | 11/1992 |
| WO | WO 2004/005849 A1 | 1/2004 |

OTHER PUBLICATIONS

"UMESS 300 Universal- Meβprogramm" Ausgabe: Aug. 1989.

"Die Bibliothek der Technik 41, Koordinaten-meβtechnik.".

Invoice dated Jun. 21, 1989 to Sandvik do Brazil. "Baustein der Zeiss CNC-Koordinaten-Meβgerate.".

* cited by examiner

USE OF SURFACE MEASUREMENT PROBES

The present invention relates to the measurement of workpieces using surface measurement probes. In particular, the invention relates to the measurement of artefacts using a surface measurement probe mounted on a coordinate positioning apparatus such as a coordinate measuring machine (CMM) (including parallel machines such as tripods and hexapods), machine tool, manual coordinate measuring arms, robots, for example work inspection robots, and single axis machines.

Measurement probes are known which have a stylus which is deflectable when acted upon by a force as a result of contact between the stylus and the surface of an object. One or more transducers within the probe measure the deflection of the stylus (usually in three orthogonal coordinate directions) in order to obtain information about the position of the surface. In use, such a probe is mounted on a machine such as a coordinate measuring machine (CMM), machine tool, measuring robot or other coordinate positioning apparatus. The machine moves the probe relative to the object to be measured. This may comprise the machine spindle and/or bed moving relative to one another. Measurement devices in the machine give outputs relating to the relative position of the probe which when combined with the outputs from the probe itself enable information to be obtained about the size, shape, position, surface contours etc of the object.

Such a measuring probe may be referred to as an analogue probe, distinguishing the measurement outputs of its transducers from probes which merely produce a trigger signal upon contact with an object. The term scanning probe may also be used since such probes are often used for scanning the surface contour of an object. Even though the term analogue probe may be used, the outputs of the transducers may in fact be analogue or digital.

This is an example of a passive probe, in which during measurement the springs in the suspended probe mechanism generate a force to match the deflection. This contact force varies with deflection but is highly repeatable.

U.S. Pat. No. 3,869,799 discloses a probe with a stylus supported by a series of spring parallelograms and in which motors are provided to generate a predetermined force between the stylus tip and the workpiece to be measured.

This probe is a type of active scanning probe which uses a motorised mechanism to control stylus deflection and modulate the contact force with the component to be measured. In such a probe, motors, rather than springs, generate the contact force.

Non-contact measuring probes are also known in which the probe measures the distance from the surface of an object and the probe by non-contact means, such as capacitance, inductance and optical.

In known systems, measurement errors are caused by deflections of the probe and machine structure. For example when the stylus is deflected, it is biased towards a zero position, for example by springs, and these forces cause bending of the probe stylus and of structural components of the machine. Whilst small, such deflections can nevertheless affect the accuracy of measurement in view of the extremely high accuracies nowadays demanded.

Our earlier International Patent Application WO92/20996 describes a method of measurement in which such a probe is moved into contact with the surface of an object to be measured and the movement is continued for a further limited distance after initial contact has been made. During this movement the outputs of the measuring devices of the machine and the transducers of the probe are simultaneously recorded at a plurality of instants. These recorded outputs are then used to compute by extrapolation the values of the outputs of the measuring devices of the machine which were existing at the instant that the probe stylus was in a state of zero deflection and still in contact with the surface.

This method allows an analogue probe to be used as if it were a very accurate touch trigger probe since the value of the machine's outputs is determined at the point when the stylus contacts a surface in the same way as a trigger probe. The high accuracy of this method derives partly from the fact that many data points are taken in order to determine the point of contact, so that errors tend to be averaged out. Furthermore the particular advantage is that the contact point determined corresponds to zero deflection of the stylus and consequently zero contact force between the stylus and the object, so that errors due to bending of the stylus and/or the machine structure do not arise.

As discussed above, this method eliminates errors caused by static measurement forces. However dynamic errors still arise. The dynamic errors may be velocity based, for example errors caused by damping, or acceleration based, for example errors caused by vibration.

A first aspect of the present invention provides a method of measuring an artefact using a machine on which a measuring probe is mounted for relative movement with respect to the artefact, said machine having at least one measuring device for providing an output indicative of the relative position of the probe, the probe having at least one measuring device to provide one or more probe outputs which in combination with the machine output are indicative of the position of a point on the surface of the artefact, the method having the following steps in any suitable order:

(a) determining the approximate position of one or more points on the surface of the artefact ;

(b) using the approximate position determined in step (a) to drive at least one of the probe and artefact to one or more desired relative positions of the probe and the surface and taking one or more surface measurements of said point on the surface of the artefact at said position, wherein there is no relative movement between the probe and the artefact whilst the one or more surface measurements are taken; and (c) using data from step (b) to determine a position of the one or more points on the surface in which dynamic error is substantially reduced.

The approximate position of a point on a surface may be determined by taking one or more readings with a measurement probe. The one or more readings may be taken whilst there is relative movement between the probe and the surface. Alternatively, the one or more readings may be taken whilst the probe is stationary relative to the surface.

The measurement in step (b) may be taken with the probe at a position closer to the surface than the measurement in step (a). The probe may have a deflectable stylus, and the surface measurement in step (b) may be taken at a low stylus deflection or a low probe force. Alternatively, the probe may comprise a non-contact probe, and the surface measurement in step (b) may be taken at a favourable stand-off.

The step of taking one or more data readings whilst there is no relative movement between the probe and the artefact may comprise recording many data readings and taking an average of the data readings.

The approximate position of a point on the surface may be determined by taking two or more readings with a measurement probe, said reading being taken at different stylus deflection, probe forces or probe stand-offs, and the data relating to said two or more readings may be extrapolated to determine the approximate position. Static errors may thereby be reduced. Step c) may comprise extrapolating data from two or more surface measurements, said two or more surface positions having different stylus deflections, probe forces or probe stand-offs. Static errors may thereby be reduced. At least one of said two or more surface measurements may be obtained from step a).

The probe may comprise a linear probe and measurement data may be obtained from two or more positions. Alternatively, the probe may comprise a non-linear probe and measurement data may be obtained from three or more positions.

The step of determining the approximate position of a point on the surface of the artefact in step (a) may be done taking one or more surface measurements of the point on the surface of the object, wherein the one or more surface measurements are taken whilst there is no relative movement between the probe and the artefact;
  wherein at least one of the one or more surface measurements in step a) and at least one of the one or more surface measurements in step b) are collected at different probe forces, stylus deflection or probe stand-offs;
  and extrapolating the measurement data to that corresponding to the position of said point on the surface of the artefact.

The step of determining the approximate position of a point on the surface of the artefact in step (a) may be done by taking two or more surface measurements of the point on the surface of the object, wherein the measurements are taken whilst there is no relative movement between the probe and the artefact, the two or more surface measurements being collected at different probe forces, stylus deflections or probe stand-off; and extrapolating the measurement data to that corresponding to the position of said point on the surface of the artefact.

The step of determining the approximate position of a point on the surface of the artefact in step (a) may be done by taking one or more surface measurements of the point on the surface of the object, wherein the one or more surface measurements are taken whilst there is relative motion between the probe and artefact at constant speed; and wherein the one or more measurements in step a) and step b) have the same probe deflection, probe force or stand-off and wherein the difference in the measurements in steps a) and b) enables the dynamic error to be determined. In the step of taking one or more surface measurements, the one or more surface measurement may be taken when there is relative motion between the probe and artefact at constant speed and wherein the probe deflection or force is lower than in steps a) and b) and wherein the one or more surface measurement taken at the lower probe deflection or force is corrected for dynamic error.

A second aspect of the invention provides a method of measuring an artefact using a machine on which a measuring probe is mounted for relative movement with respect to the artefact, said machine having at least one measuring device for producing an output indicative of the relative position of the probe, the probe having at least one measuring device to provide one or more probe outputs which in combination with the machine output are indicative of the position of a point on the surface of the artefact, the method having the following steps in any suitable order:
  (a) taking two or more surface measurements of a point on the surface of the artefact, wherein the measurements are taken whilst there is no relative movement between the probe and the artefact, the two or more surface measurements being collected at different probe forces, stylus deflections or probe stand-off;
  (b) extrapolating the measurement data to that corresponding to the position of said point on the surface of the artefact.

The probe may have a deflectable stylus, and the probe may have different stylus deflections at the at least two positions and wherein the measurement data may be extrapolated to correspond with the rest position of the stylus. The probe may have a deflectable stylus, and there may be different probe forces between the stylus and the surface of the artefact at the at least two positions and wherein the measurement data may be extrapolated to correspond with zero probe force. The probe may comprise a non-contact probe, and the probe may be at different stand-offs from the surface of the artefact at at least two positions and wherein the measurement data may be extrapolated to determine the surface position.

The probe may be a linear probe and measurement data may be obtained from two or more positions. Alternatively, the probe may be a non-linear probe and wherein the measurement data may be obtained from three or more positions.

The step of taking one or more data readings whilst there is no relative movement between the probe and the artefact may comprise recording many data readings and taking an average of the data readings.

A third aspect of the present invention provides a method of measuring an artefact using a machine on which a measuring probe is mounted for relative movement with respect to the artefact, said machine having at least one measuring device for providing an output indicative of the relative position of the probe, the probe having at least one measuring device to provide one or more probe outputs which in combination with the machine output are indicative of the position of a point on the surface of the artefact, the method having the following steps in any suitable order:
  (a) taking two or more surface measurements of a point on the surface of the artefact wherein said two or more measurements have the same probe deflection or probe force and wherein one or more surface measurement is taken with relative motion between the probe and artefact at constant speed and one or more surface measurement is taken with no relative motion between the probe and artefact;
  (b) determining the dynamic error from step (a)
  (c) taking one or more surface measurements of said point on the surface of the artefact, wherein the measurement is taken with a smaller probe deflection or probe force than the measurements in step (a) and wherein the measurement is taken with relative motion between the probe and artefact at constant speed;
  (d) correcting the one or more surface measurements of step (c) for dynamic error to thereby provide a measurement having reduced static and dynamic errors.

A fourth aspect of the present invention provides apparatus for measuring an artefact using a machine on which a measuring probe is mounted for relative movement with respect to the artefact, said machine having at least one measuring device for providing an output indicative of the relative position of the probe, the probe having at least one measuring device to provide one or more probe outputs which in combination with the machine output are indicative of the position of a point on the surface of the artefact, the apparatus comprising a controller for carrying out the following steps in any suitable order:
  (a) determining the approximate position of one or more points on the surface of the artefact ;
  (b) using the approximate position determined in step (a) to drive at least one of the probe and artefact to one or more desired relative positions of the probe and the surface and taking one or more surface measurements of said point on the surface of the artefact at said location, wherein there is no relative movement between the probe and the artefact whilst the one or more surface measurements are taken; and (c) using data from step (b) to determine a position of the one or more points on the surface in which dynamic error is substantially reduced.

A fifth aspect of the invention provides apparatus for measuring an artefact using a machine on which a measuring probe is mounted for relative movement with respect to the artefact, said machine having at least one measuring device for producing an output indicative of the relative position of the probe, the probe having at least one measuring device to provide one or more probe outputs which in combination with the machine output are indicative of the position of a point on the surface of the artefact, the apparatus comprising a controller for carrying out the following steps in any suitable order:

(a) taking two or more surface measurements of a point on the surface of the artefact, wherein the measurements are taken whilst there is no relative movement between the probe and the artefact, the two or more surface measurements being collected at different probe forces, stylus deflections or probe stand-off, (b) extrapolating the measurement data to that corresponding to the position of said point on the surface of the artefact.

A sixth aspect of the present invention provides apparatus for measuring an artefact using a machine on which a measuring probe is mounted for relative movement with respect to the artefact, said machine having at least one measuring device for providing an output indicative of the relative position of the probe, the probe having at least one measuring device to provide one or more probe outputs which in combination with the machine output are indicative of the position of a point on the surface of the artefact, the apparatus comprising a controller for carrying out the following steps in any suitable order:

(a) taking two or more surface measurements of a point on the surface of the artefact wherein said two or more measurements have the same probe deflection or probe force and wherein one or more surface measurement is taken with relative motion between the probe and artefact at constant speed and one or more surface measurement is taken with no relative motion between the probe and artefact;

(b) determining the dynamic error from step (a)

(c) taking one or more surface measurements of said point on the surface of the artefact, wherein the measurement is taken with a smaller probe deflection or probe force than the measurements in step (a) and wherein the measurement is taken with relative motion between the probe and artefact at constant speed;

(d) correcting the one or more surface measurements of step (c) for dynamic error to thereby provide a measurement having reduced static and dynamic errors.

The invention will now be described by way of example with reference to the accompanying drawings in which.

A known method of using a scanning probe to take touch trigger measurements of a surface will now be described with reference to FIGS. 1 and 2.

Figure 1:
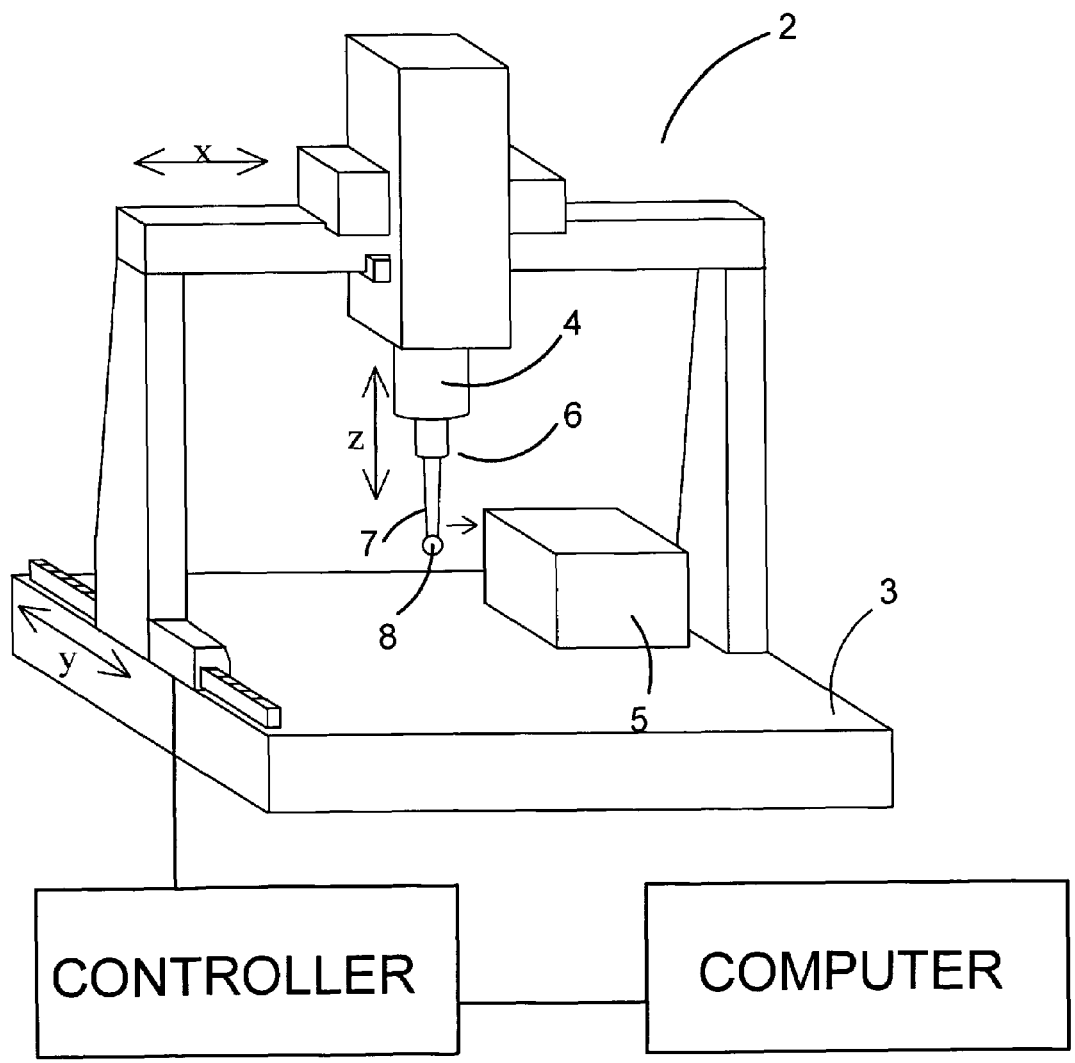
FIG. 1 is a diagrammatic representation of a CMM with which the invention is used.

Referring to the drawings, FIG. 1 shows a coordinate measuring machine (CMM) 2 which is well known in the art. The CMM 2 has a machine table 3 on which an object 5 to be measured is mounted and a spindle 4 which is movable in x,y and z relative to the machine table 3. The machine spindle and/or the machine table may move to create relative movement between the machine spindle and table. Transducers (not shown) are provided to measure the relative position of the spindle with respect to the machine table in x,y and z. Variations of the set up are known in which relative motion between the object and the probe are provided by other means, for example by moving the object whilst the probe remains stationary.

A probe 6 is mounted on the spindle 4 of the CMM 2. The probe 6 has a deflectable stylus 7 with a workpiece contacting tip 8. Transducers are provided in the probe to measure deflection of the stylus. An example of such a probe is described in U.S. Pat. No. 5,390,424 in which a stylus is supported relative to a fixed structure may for example be three serially connected parallel springs. Displacement of the stylus relative to the fixed structure is transduced by optical means, comprising three optical scales provided on a member to which the stylus is connected and corresponding readhead located on the fixed structure adjacent the optical scales.

The probe is driven by the machine controller towards the object. During this movement the readings of the CMM transducers are continually fed into the computer which forms part of the overall machine control system.

Whilst the stylus is in its rest position (i.e. the position which it occupies when no external forces act on the stylus tip), the output of the probe transducers is set to zero.

As soon as the stylus tip is deflected by contact with the object, the output of the probe transducers starts to change. This causes a signal to be sent to the machine controller (in known manner) to commence reading the machine scales and to output the values of the computer. A further limited amount of travel of the machine is allowed by the computer and then the machine is stopped and reversed. During the reversing movement, the outputs of the machine transducers and of the probe transducers are recorded simultaneously at intervals. The controller stops the machine and the computer calculates from the readings a notional curve (e.g. a straight line) through the readings and extrapolates back to find the readings of each of the machine scales which would have existed at the very instant the stylus ball contacted the surface. This is the reading of each of the machine scales at the point when the output of the probe transducers was last at the level equating to the rest position of the stylus.

Figure 2:
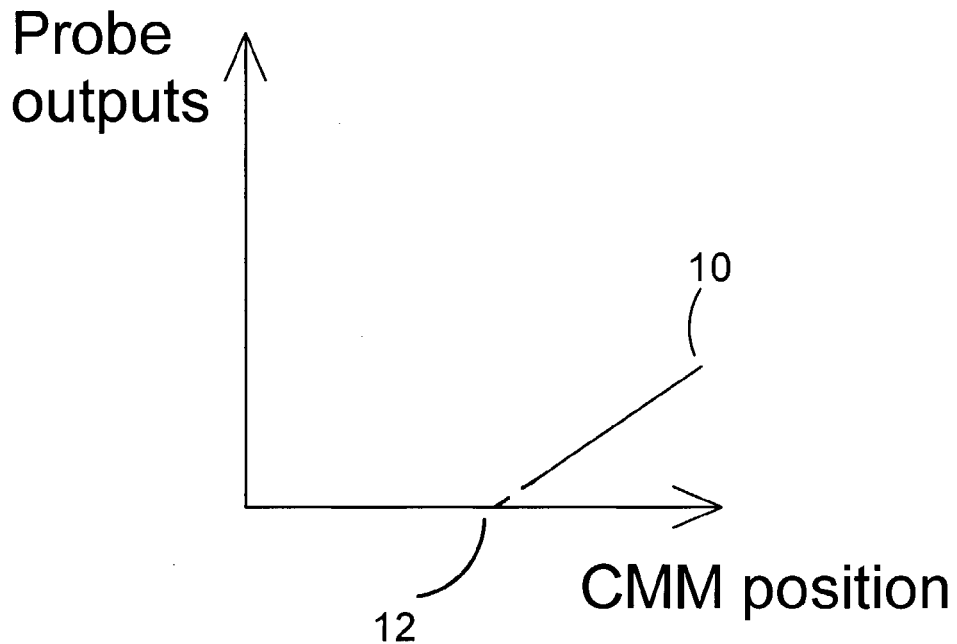
FIG. 2 is a graph of probe outputs against CMM position in a prior art method.

FIG. 2 shows by a graphical representation the calculations which are made by the machine's computer. The vertical axis shown represents the outputs of the probe transducers and the horizontal axis represents the CMM transducer outputs of one axis. As the machine continues its limited movement after contact has been made between the probe stylus and surface, the probe output increases as the stylus is deflected. A straight line 10 is plotted from the probe outputs and extrapolated back to find the measurement scale readings at the probe output representative of zero. At this point 12 the probe stylus is at its rest position and thus there is zero force between the stylus and the object.

This method eliminates the errors caused by static measurement forces. However the measurements still contain dynamic errors. These may comprise velocity based errors, for example caused by damping and acceleration based errors for example caused by vibration of the probe.

Figure 3:
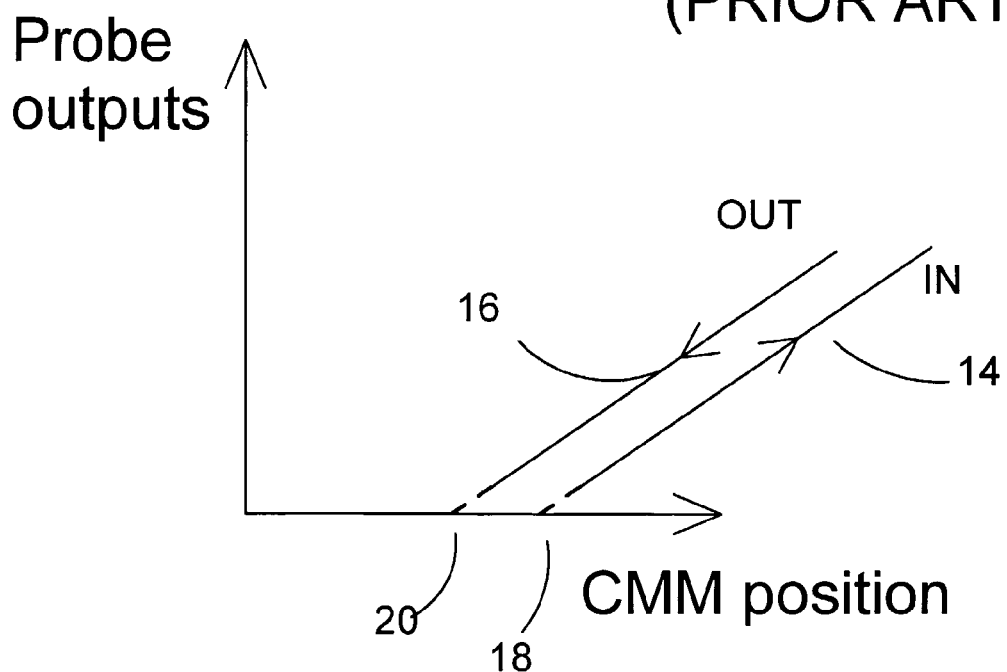
FIG. 3 is a graph of probe outputs against CMM position illustrating the difference in readings between the measurements towards and away from a surface.

FIG. 3 illustrates the different measurement data obtained when moving the probe towards or away from the surface. Line 14 illustrates the measurement data obtained by moving the probe towards the surface and line 16 illustrates the measurement data obtained when moving the probe away from the surface. When the measurement data is extrapolated back, the measurement data obtained during movement towards the surface produces a first value 18 of the measurement at zero probe force and extrapolation using the measurement data in the outward movement of the probe produces a second value 20 of the measurement relating to zero probe force. The difference in these measurement values 18,20 is due to dynamic errors. For example the speed of the probe during its movement in opposite directions is a cause of this error. Different speeds in the different directions of the movement of the probe increase the difficulty in calculating this error.

Figure 4:
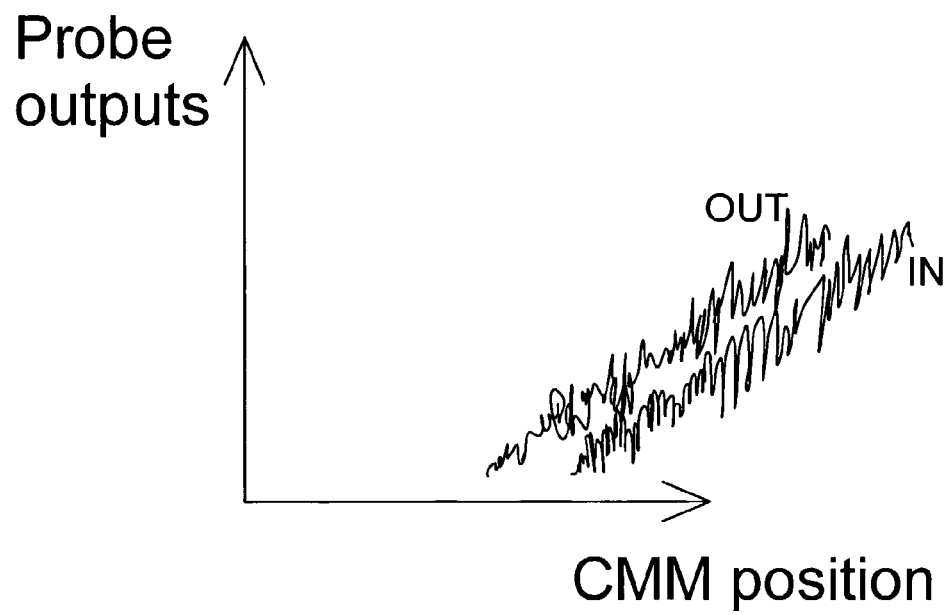
FIG. 4 is a graph of probe outputs against CMM position showing velocity based errors due to damping.

FIG. 4 illustrates the errors due to a poorly damped probe. Vibrations cause errors in the measurement data which must be averaged out before extrapolation. In a damped probe the vibration may have a low frequency and thus the measurement data must be averaged out over a sufficiently large time. In an over-damped probe, there is a lag before the probe reaches its steady state.

Figure 5:
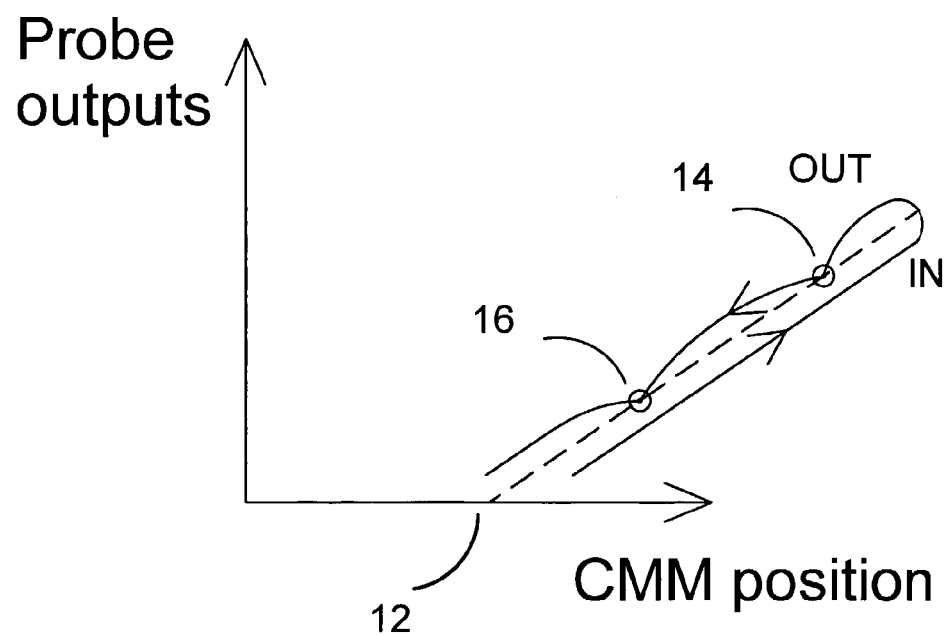
FIG. 5 is a graph of probe outputs against CMM position obtained using an implementation of the method of the present invention.

The present invention will now be described with reference to FIG. 5. FIG. 5 illustrates a graph of probe outputs against CMM position. As described above, the probe is mounted onto a machine such as a coordinate measuring machine (CMM) or machine tool which provides the probe with relative movement with respect to a workpiece. The probe is moved towards the workpiece until the stylus tip is brought into contact with the surface of the workpiece. The probe continues to move towards the workpiece for a certain distance, thus causing the probe stylus to deflect. The probe is reversed and is stopped at a first position 14 in which the stylus tip remains in contact with the surface. Measurement data is taken whilst the probe is stationary at this first position 14. The probe continues in its reverse motion to a second position 16 in which the stylus tip is still in contact with the surface and measurement data is taken. The probe then continues in its reverse movement until the stylus tip leave contact with the surface.

At the first and second positions, the probe is preferably allowed to settle before measurements are taken. Once the probe has settled, several measurements are taken whilst the probe is stationary at these positions. The measurement data taken from the plurality of measurements is averaged. As these measurements are taken when the probe is stationary there are no dynamic errors. Therefore errors due to effects such as vibration and damping are eliminated. The average measurement data taken at the two positions is extrapolated back to determine the measurement scale readings at zero stylus deflection and thus zero probe force. As the extrapolation technique is used, static measurement force errors are eliminated.

The accuracy of the measurement data taken at point 16 is more important than that of the measurement data taken at point 14, as point 16 is closer to the extrapolated value. Therefore, the probe may remain stationary longer for the positions closer to the surface to ensure accuracy of the measurement data. Data at a minimum of two positions is taken in order to linear fit the measurement data at these positions, measurement data must be obtained from at least three positions for other types of fit.

Although the above description describes the probe stopping at the first and second positions in the outward probe motion, it is also possible for measurements to be taken when the probe is stationary at similar positions on the inward motion. It is also possible for measurements to be taken during both the probe inward and outward motion.

Use of this method allows the probe to be moved at a fast speed because the measurement data is collected when the probe is stationary the speed of the probe in between measurement positions does not affect the measurement data.

This method is also suitable for use with an active probe. In this case, the probe is held against the surface of the object at a certain stylus deflection and the probe force is changed. At two or more different probe forces, the probe force is kept constant while several surface measurements are taken at this probe force. The measurement data taken at these different probe force values is extrapolated back to correspond to zero measurement force.

This method is also suitable for non-contact probes, such as capacitance and inductance probes. Non-contact probes are typically calibrated on a datum sphere. However local topology, for example burrs and chamfered edges, can cause errors in the measurement readings. The non-contact probe is moved towards the surface of the object to be measured. It is stopped at two or more different distances from the surface and measurement readings are taken at these different locations. As before, the measurement readings at these locations are extrapolated to find the measurement value corresponding to the probe being in contact with the surface.

The mathematical relationship between the probe distance from the surface and the measurement data may already be known for the probe on a particular surface, e.g. a 3rd order polynomial. If the mathematical relationship is not known, this mathematical relationship must be determined as a first step from the data before the extrapolation can be done.

A second embodiment of the invention will now be described with reference to FIG. 6, which illustrates a graph of probe outputs against CMM position.

In this method, surface measurements are taken from just one stationary position of the probe, when the probe is located near the surface of the object to be measured. As a first step, the approximate location of the surface is determined in order to enable the probe position for the stationary measurement to be positioned close to the surface.

The approximate location of the surface may be determined by taking a single measurement 20 without the requirement that the probe is stationary. This measurement gives an approximate surface measurement within an error band, i.e. a band of possible CMM positions corresponding to zero stylus deflection or zero probe force.

The probe is then held stationary at a location 24, inside but near the surface using the approximate position of the stylus to determine where to place the probe. As before, several measurements may be taken and averaged at this position. The surface measurement determined when the probe is stationary produces an accurate surface measurement.

Figure 6:
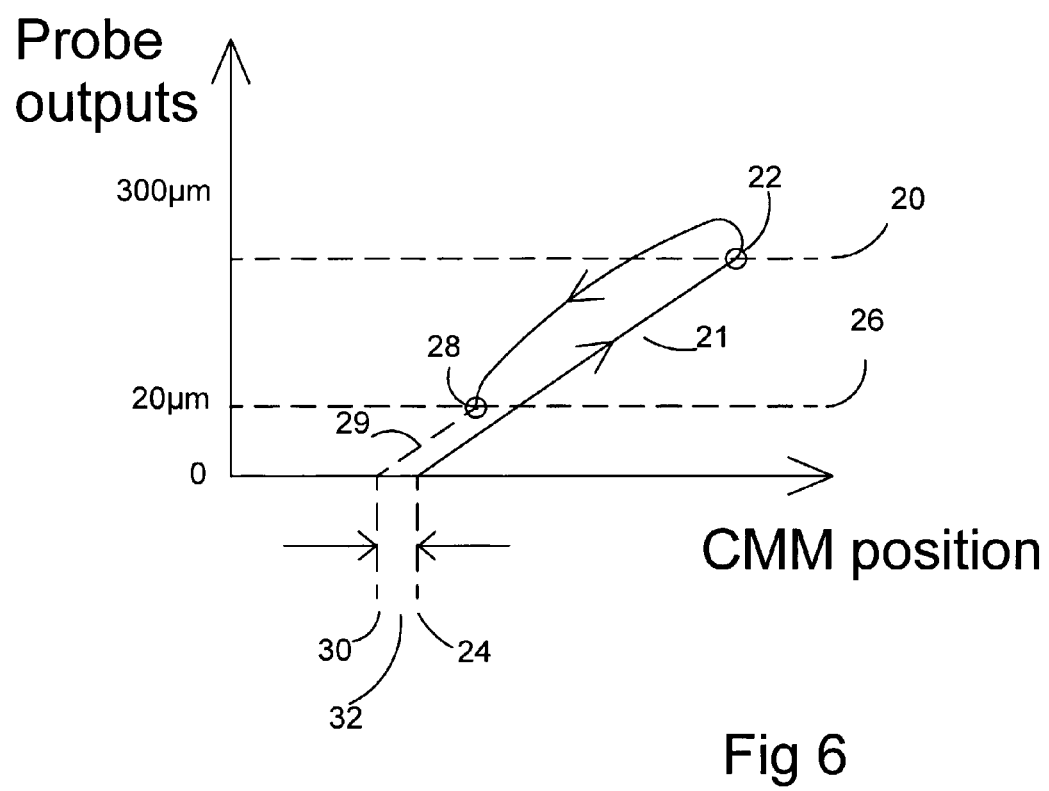
FIG. 6 is a graph of the probe outputs against CMM position illustrating a third embodiment of the invention.

As illustrated in FIG. 6, the probe is moved towards the surface whilst data is continuously collected. When the probe passes a deflection threshold 20, for example 300 μm, the probe and machine data is latched. This latched data 22 is used to determine an approximate surface position 24.

The slope of line 21 is determined from the gain of the probe which is known from calibration of the probe.

The probe is then moved towards this approximate surface position, for example a position 26 located 20 μm into the surface. At this position 26, a measurement is taken whilst the probe is stationary relative to the surface. As before, several surface measurements may be taken at this position and averaged. The measurements data 28 produced whilst the probe is stationary give an accurate surface position 30. As before, the slope of line 29 is determined from the gain of the probe. Errors in the gain calibration may occur due to, for example, different values of the gain at different positions of the machine's working volume. This method of taking a measurement close to the surface has the advantage that if there is an error in the gain and thus the slope 29, the resulting measurement error is minimised.

The difference between the approximate surface position 24 and the accurate surface position 30 give the dynamic error of the system 32.

A more accurate position measurement is taken if the first step of determining the approximate surface position comprises taking two surface measurements at different probe deflections, probe forces or probe stand-offs, each taken whilst the probe is stationary. The approximate surface position is determined by extrapolating through these two measurement points. This extrapolation also determines the slope of line 21 more accurately and thus the gain of the probe. This gain is used to determine the surface position from the measurement close to the surface. Thus measurement errors due to errors in the gain of the probe are eliminated.

As before, the probe is then held stationary at a location inside but near approximate surface position determined in the previous step.

The method of this second embodiment is suitable for active and passive contact probe.

The method of this second embodiment is also suitable for non-contact probes. In this case, a first measurement is taken with the non-contact at a first distance from the surface to determine an approximate surface measurement. The non-contact probe is then moved to an optimum stand-off from the surface as determined by the approximate surface position. For some probes, e.g. a capacitance probe, this may be a location close to the surface. In other types of probes, for example optical probes, this may be a "a sweet spot" stand-off further away from the surface. In this second position a surface measurement is taken whilst the probe is stationary and many readings may be taken and averaged to determine an accurate surface position.

Figure 7:
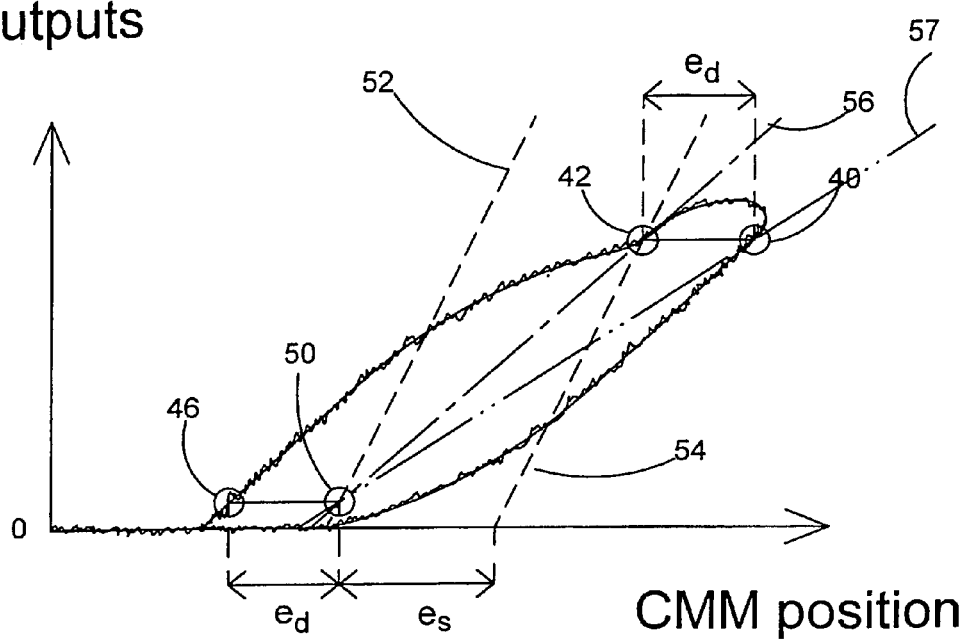
FIG. 7 illustrates a graph of probe output against CMM position.
Figure 8:
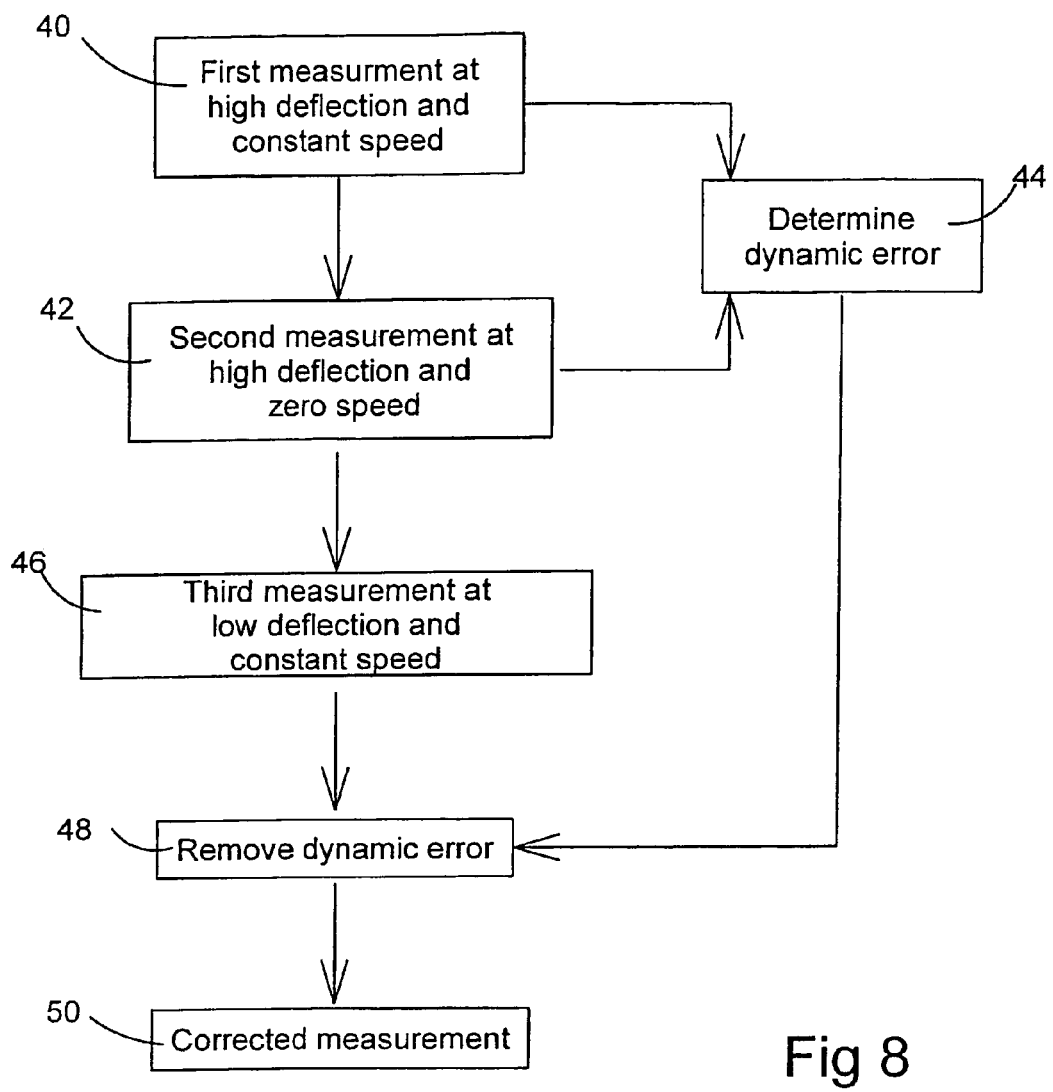
FIG. 8 is a flow diagram illustrating the method of the third embodiment.

A third embodiment of the invention will now be described with reference to FIGS. 7 and 8. FIG. 7 illustrates a graph of probe output against CMM position and FIG. 8 is a flow diagram illustrating the method.

As in previous embodiments, a workpiece is placed on the table of a CMM and a measurement probe is mounted on the quill of the CMM. The probe is moved towards the surface of a workpiece. When the probe stylus comes into contact with the workpiece, the probe continues its movement until a predefined deflection is reached. During the motion of the probe, the probe outputs are latched at a position when the probe stylus is in contact with the surface and a first measurement 40 taken, this first measurement being taken at constant speed and known predefined deflection (e.g. 0.3 mm deflection).

In a second step the probe is reversed away from the surface of the workpiece. When the probe is at the same deflection as the first measurement (e.g. 0.3 mm), the probe is stopped and a second surface measurement 42 is taken whilst the probe is stationary.

This second measurement has zero dynamic error due to the probe being stationary. However there is static error due to the probing force.

On FIG. 7, curve 52 is the gain of the probe which has been deduced from calibration. This curve assumes infinite rigidity of the system. However, if the data from second measurement 42 is extrapolated down a curve 54 parallel to curve 52, the resultant surface data will have a measurement error due to static error $e_s$.

As the first and second measurements 40,42 were taken at the same probe deflection they will experience the same probing force and thus the same static error. The difference between the measurements is the dynamic error $e_d$ due to the speed at which the first measurement was taken. The dynamic error may thus be determined 44 from the difference between the first and second measurements 40,42.

The measurement data from the second measurement 42 (or alternatively and more approximately the first measurement 40) can be used to approximate the surface of the workpiece. This enables the position for the third measurement to be chosen, which will be at a low deflection.

The probe is then moved away from the workpiece and a third measurement 46 is taken at constant speed and at low deflection. As this probe is taken at low probe deflection (e.g. 10 μm), there will be minimal static errors due to probing force. However, there will be dynamic errors due to the probe moving at constant speed. The dynamic error previously determined 44 can be subtracted from the measurement data. Dynamic error is thus removed.

Thus the corrected surface position 50 has been corrected for both static and dynamic errors.

It is not necessary for the first and second measurements to be taken at the same speed, as long as the relationship between dynamic error and speed is known. For most systems the relationship between speed and dynamic error is linear and so can be derived without an additional step. For systems with a non linear relationship, this relationship may be determined by taking several measurements at the same deflection but different speed as the first measurement.

The curve 56 which represents the actual gain of the probe is thus different from the curve 52 derived from calibration, as it takes into account static errors. Curve 57 takes into account both static and dynamic errors.

As with the other embodiments, this is also suitable for use with an active probe. In this case the first and second measurements are taken at the same probe force and the third measurement is taken at a probe force which is low compared to the first and second measurements.

In all of these embodiments, the computations may be performed by a controller. This may comprise the machine controller or a separate computer (e.g. a PC).

The embodiments above describe a probe mounted on a three axis machine, in which movement of the machine is stopped to make the probe stationary. However, the probe may be mounted on other types of machine. For example, the probe may be mounted on a rotary axis, a multi axis machine or a five or six axis machine tool.

The probe may be mounted on an articulating probe head having rotary movement about two axes. Such an articulating probe head is described in European Patent EP 0402440 B1 which describes a probe head which allows the probe to be rotated about first and second preferably orthogonal axes. This movement is controlled by motors and measured by transducers provided in the probe head. The probe head may in turn be mounted on a machine having, for examples, linear axes. The probe head is not necessarily coupled to the machine.

The invention claimed is:

1. A method of measuring an artefact using a machine on which a measuring probe is mounted for relative movement with respect to the artefact, said machine having at least one measuring device for providing an output indicative of the relative position of the probe, the probe having at least one measuring device to provide one or more probe outputs which in combination with the machine output are indicative of the position of a point on the surface of the artefact, the method having the following steps in any suitable order:
   (a) determining the approximate position of one or more points on the surface of the artefact;
   (b) using the approximate position determined in step (a) to drive at least one of the probe and artefact to one or more desired relative positions of the probe and the surface and taking one or more surface measurements of said one or more points on the surface of the artefact at said position, wherein there is no relative movement between the probe and the artefact whilst the one or more surface measurements are taken; and
   (c) using data from step (b) to determine a position of the one or more points on the surface in which dynamic error is substantially reduced.

2. A method according to claim 1 wherein the approximate position of a point on the surface is determined by taking one or more readings with a measurement probe.

3. A method according to claim 2 wherein the one or more readings is taken whilst there is relative movement between the probe and the surface.

4. A method according to claim 2 wherein the one or more readings is taken whilst the probe is stationary relative to the surface.

5. A method according to claim 2 wherein the measurement in step (b) is taken with the probe at a position closer to the surface than the measurement in step (a).

6. A method according to claim 2 wherein the approximate position of a point on the surface is determined by taking two or more readings with a measurement probe, said readings being taken at different stylus deflections, probe forces or probe stand-offs and the data relating to said two or more readings is extrapolated to determine the approximate position.

7. A method according to claim 6, wherein the probe is a linear probe and measurement data is obtained from two or more positions.

8. A method according to claim 6 wherein the probe is a non linear probe and wherein the measurement data is obtained from three or more positions.

9. A method according to claim 1 wherein the probe has a deflectable stylus, and wherein the surface measurement in step (b) is taken at a low stylus deflection.

10. A method according to claim 1 wherein the probe has a deflectable stylus, and wherein the surface measurement in step (b) is taken at a low probe force.

11. A method according to claim 1 wherein the probe comprises a non-contact probe, and wherein the surface measurement in step (b) is taken at a favorable stand-off.

12. A method according to claim 1 wherein the step of taking one or more surface measurements whilst there is no relative movement between the probe and the artefact comprises recording a plurality of surface measurements and taking an average of the surface measurements.

13. A method according to claim 1 wherein step c) comprises extrapolating data from two or more surface measurements, said two or more surface positions having different stylus deflections, probe forces or probe stand-offs.

14. A method according to claim 13 wherein at least one of said two or more surface measurements is obtained from step a).

15. A method according to claim 1 wherein the step of determining the approximate position of a point on the surface of the artefact in step (a) is done by taking one or more surface measurements of the point on the surface of the artefact, wherein the one or more surface measurements of step (a) are taken whilst there is relative motion between the probe and artefact at constant speed; and wherein the one or more measurements in step a) and step b) have the same probe deflection, probe force or stand-off and wherein the difference in the measurements in steps a) and b) enables the dynamic error to be determined.

16. A method according to claim 15 wherein the method includes the further step (d) of taking one or more surface measurements, wherein the one or more surface measurements are taken when there is relative motion between the probe and artefact at constant speed and wherein the probe deflection or force is lower than in steps a) and b) and wherein the one or more surface measurements taken in the step (d) at the lower probe deflection or force are corrected for dynamic error.

17. A method of measuring an artefact using a machine on which a measuring probe is mounted for relative movement with respect to the artefact, said machine having at least one measuring device for producing an output indicative of the relative position of the probe, the probe having at least one measuring device to provide one or more probe outputs which in combination with the machine output are indicative of the position of a point on the surface of the artefact, the method having the following steps in any suitable order:
   (a) taking two or more surface measurements of a point on the surface of the artefact, wherein the measurements are taken whilst there is no relative movement between the probe and the artefact, the two or more surface measurements being collected at different probe forces, stylus deflections or probe stand-off,
   (b) determining the position of said point on the surface of the artefact by extrapolating said two or more surface measurements.

18. A method according to claim 17 wherein the probe has a deflectable stylus, wherein said two or more surface measurements taken in step (a) are collected with the probe having different stylus deflections, and wherein, in step (b), said two or more surface measurements are extrapolated to correspond with the rest position of the stylus.

19. A method according to claim 17 wherein the probe has a deflectable stylus, wherein said two or more surface measurements taken in step (a) are collected with different probe forces between the stylus and the surface of the artefact; and wherein, in step (b), said two or more surface measurements are extrapolated to correspond with zero probe force.

20. A method according to claim 17 wherein the probe comprises a non-contact probe, wherein said two or more surface measurements taken in step (a) are collected with the probe at different stand-offs from the surface of the artefact, and wherein, in step (b), said two or more surface measurements are extrapolated to determine the surface position.

21. A method according to claim 17 wherein the probe is a linear probe and measurement data is obtained from two or more positions.

22. A method according to claim 17 wherein the probe is a non-linear probe and wherein the measurement data is obtained from three or more positions.

23. A method according to claim 17 wherein the step of taking two or more surface measurements whilst there is no relative movement between the probe and the artefact comprises recording many surface measurements and taking an average of the surface measurements.

24. A method of measuring an artefact using a machine on which a measuring probe is mounted for relative movement with respect to the artefact, said machine having at least one measuring device for providing an output indicative of the relative position of the probe, the probe having at least one measuring device to provide one or more probe outputs which in combination with the machine output are indicative of the position of a point on the surface of the artefact, the method having the following steps in any suitable order:
   (a) taking two or more surface measurements of a point on the surface of the artefact, wherein said two or more measurements have the same probe deflection or probe force and wherein one or more surface measurement is taken with relative motion between the probe and artefact at constant speed and one or more surface measurement is taken with no relative motion between the probe and artefact;
   (b) determining the dynamic error from step (a)
   (c) taking one or more surface measurements of said point on the surface of the artefact, wherein the measurement is taken with a smaller probe deflection or probe force than the measurements in step (a) and wherein the measurement is taken with relative motion between the probe and artefact at constant speed;
   (d) correcting the one or more surface measurements of step (c) for dynamic error to thereby provide a measurement having reduced static and dynamic errors.

25. Apparatus for measuring an artefact using a machine on which a measuring probe is mounted for relative movement with respect to the artefact, said machine having at least one measuring device for providing an output indicative of the relative position of the probe, the probe having at least one measuring device to provide one or more probe outputs which in combination with the machine output are indicative of the position of a point on the surface of the artefact, the apparatus comprising a controller for carrying out the following steps in any suitable order:
   (a) determining the approximate position of one or more points on the surface of the artefact;
   (b) using the approximate position determined in step (a) to drive at least one of the probe and artefact to one or more desired relative positions of the probe and the surface and taking one or more surface measurements of said point on the surface of the artefact at said location, wherein there is no relative movement between the probe and the artefact whilst the one or more surface measurements are taken; and
   (c) using data from step (b) to determine a position of the one or more points on the surface in which dynamic error is substantially reduced.

26. Apparatus for measuring an artefact using a machine on which a measuring probe is mounted for relative movement with respect to the artefact, said machine having at least one measuring device for producing an output indicative of the relative position of the probe, the probe having at least one measuring device to provide one or more probe outputs which in combination with the machine output are indicative of the position of a point on the surface of the artefact, the apparatus comprising a controller for carrying out the following steps in any suitable order:
   (a) taking two or more surface measurements of a point on the surface of the artefact, wherein the measurements are taken whilst there is no relative movement between the probe and the artefact, the two or more surface measurements being collected at different probe forces, stylus deflections or probe stand-off,
   (b) extrapolating the measurement data to that corresponding to the position of said point on the surface of the artefact.

27. Apparatus for measuring an artefact using a machine on which a measuring probe is mounted for relative movement with respect to the artefact, said machine having at least one measuring device for providing an output indicative of the relative position of the probe, the probe having at least one measuring device to provide one or more probe outputs which in combination with the machine output are indicative of the position of a point on the surface of the artefact, the apparatus comprising a controller for carrying out the following steps in any suitable order:
   (a) taking two or more surface measurements of a point on the surface of the artefact, wherein said two or more measurements have the same probe deflection or probe force and wherein one or more surface measurement is taken with relative motion between the probe and artefact at constant speed and one or more surface measurement is taken with no relative motion between the probe and artefact;
   (b) determining the dynamic error from step (a)
   (c) taking one or more surface measurements of said point on the surface of the artefact, wherein the measurement is taken with a smaller probe deflection or probe force than the measurements in step (a) and wherein the measurement is taken with relative motion between the probe and artefact at constant speed;
   (d) correcting the one or more surface measurements of step (c) for dynamic error to thereby provide a measurement having reduced static and dynamic errors.

* * * * *